Dec. 15, 1942.       R. H. DAVIS ET AL       2,305,467
MACHINE FOR MAKING PEANUT BUTTER
Filed April 25, 1941         3 Sheets--Sheet 1

INVENTORS
Royal H. Davis
Thomas F. Pymer
BY
Bartlett
ATTORNEYS

Dec. 15, 1942.    R. H. DAVIS ET AL    2,305,467
MACHINE FOR MAKING PEANUT BUTTER
Filed April 25, 1941    3 Sheets-Sheet 2

INVENTORS
Royal H. Davis
Thomas F. Pyrner
BY
Bartlett Eyre Keel & Weymouth
ATTORNEYS Dec. 15, 1942.  R. H. DAVIS ET AL  2,305,467
MACHINE FOR MAKING PEANUT BUTTER
Filed April 25, 1941  3 Sheets-Sheet 3

INVENTORS
Royal H. Davis
BY Thomas F. Pyrner
ATTORNEYS

Patented Dec. 15, 1942

2,305,467

UNITED STATES PATENT OFFICE 2,305,467

MACHINE FOR MAKING PEANUT BUTTER

Royal H. Davis and Thomas F. Purner, Canajoharie, N. Y., assignors to Beech-Nut Packing Company, Canajoharie, N. Y., a corporation of New York Application April 25, 1941, Serial No. 390,278

1 Claim. (Cl. 146—182)

The present invention relates to machines for manufacturing peanut butter of the kind that consists of finely ground peanut butter, and lumps or chunks of peanuts mixed therewith.

The principal object of the invention is to provide a grinding head for a peanut butter machine which is capable of simultaneously forming finely ground peanut butter, forming lumps or chunks of peanuts, and uniformly mixing the chunks with the peanut butter.

Another object of the invention is to provide a novel and improved grinding head for a machine of the character indicated.

Figure 1:
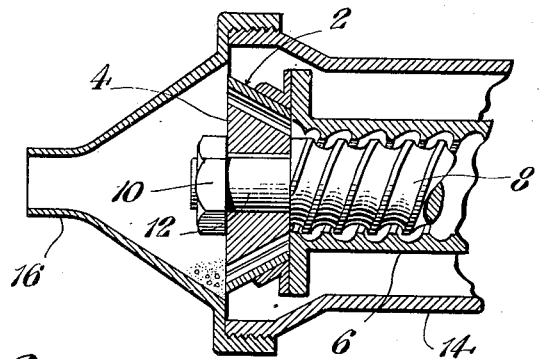
Figure 2:
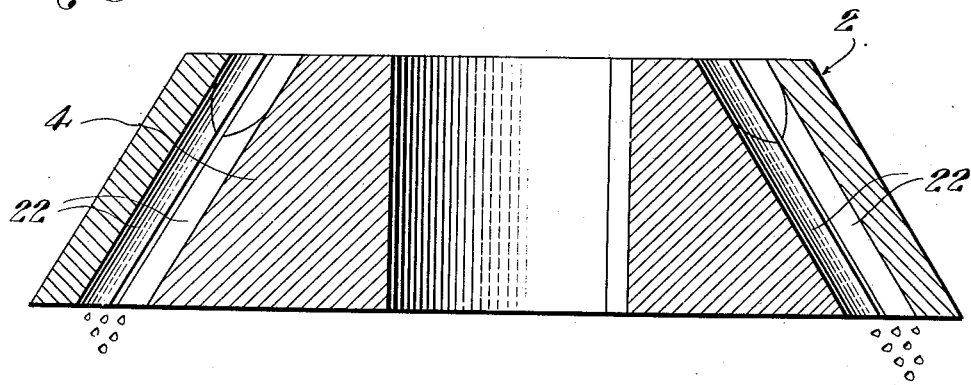
Figure 3:
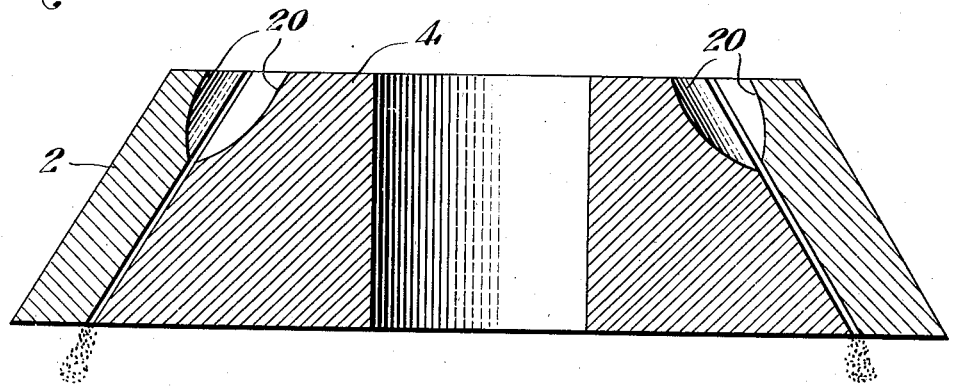
Figure 4:
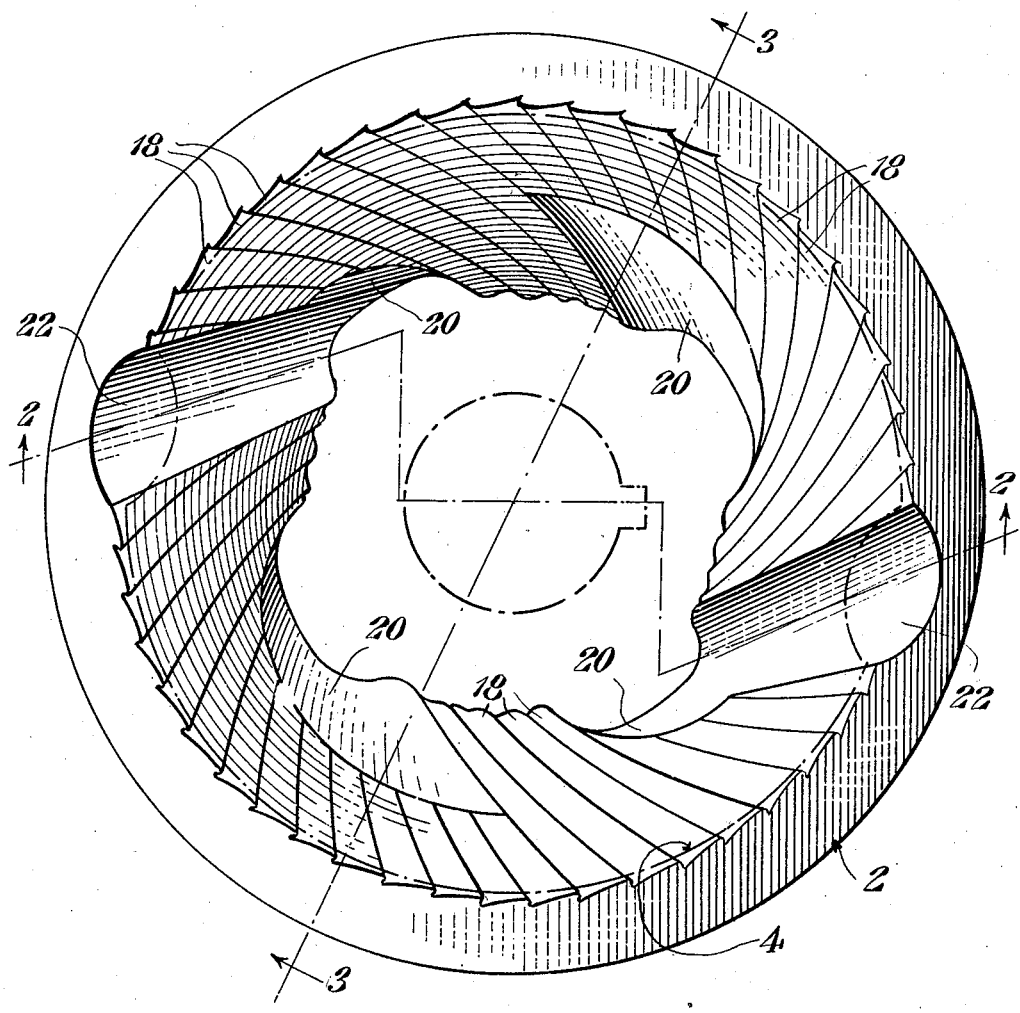
Figure 5:
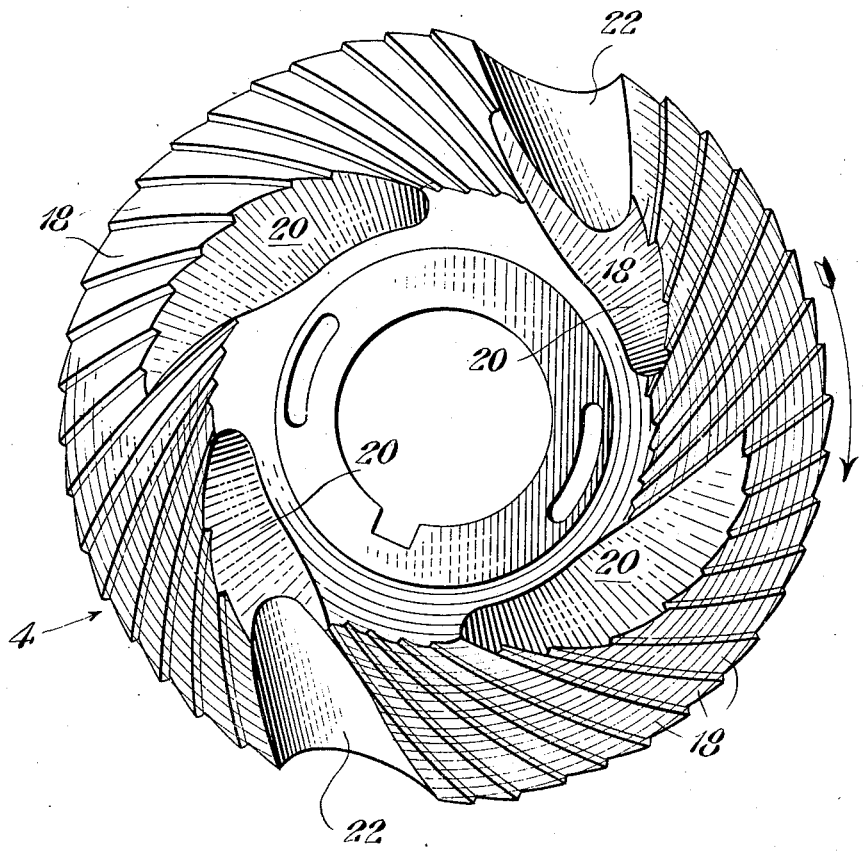

The preferred form of the invention is illustrated by way of example, in the accompanying drawings, in which:

Figure 1 is a longitudinal sectional elevation of the grinding head portion of a peanut butter making machine embodying my invention;

Figs. 2 and 3 are sectional views of the grinding members of the machine, the sections being taken on lines 2—2 and 3—3 of Fig. 4; and Figs. 4 and 5 are side elevations of the stationary and rotary grinding members respectively, the views showing especially the grinding surfaces of said members.

The peanut butter machine or mill may be of the type of the one illustrated and described in the patent to Merritt, No. 1,141,898, June 1, 1915. As shown in Fig. 1, this machine is provided with a stationary grinding member 2 and a rotary grinding member 4. The member 2 is secured on the inner end of a tubular feed screw casing 6 through which extends a feed screw 8 for feeding peanuts to the grinding members. The rotary grinding member 4 is secured on the rear end of the feed screw 8 as by a nut 10 screw-threaded on the end of a reduced end portion 12 of the feed screw, which end portion extends through an axial aperture in said rotary member 4.

Surrounding the parts above described is a casing 14 on the rear end of which is a nozzle 16 for receiving the peanut butter from the grinding head and discharging it from the machine.

The grinding surfaces of the grinding members may be conical as shown, and each is provided with curved grinding furrows 18, and flattened depressions or grooves 20 for receiving the peanuts from the screw 8 and directing them into the inner ends of the adjacent furrows.

In accordance with the present invention, each of the grinding heads is provided with diametrically opposite grooves 22 which are inclined as shown in the general direction of the inclination of the curved furrows 18.

These grooves 22 are of suitable depth so that during the operation of the grinding head the peanuts working into them are broken into small pieces or chunks of varying size, the average size being approximately one-eighth of an inch in thickness. By varying the depths of the grooves 22 the general thickness of the chunks may be varied.

With this construction, it will be apparent that during the operation of the machine the peanuts working into the furrows 18 may be finely ground to form the usual peanut butter, and as the peanut butter works out from between the peripheries of the grinding surfaces and into the nozzle 16, chunks of peanuts are uniformly discharged from the grooves 22 and are thoroughly mixed with the butter so that the completed product as it emerges from the nozzle 16 has the chunks of peanuts thoroughly and uniformly mixed therewith. By varying the number or width of the grooves, the proportion of chunks mixed with the butter may be varied.

Thus applicant has provided simple and efficient means for making peanut butter of the kind described, and a uniform product is assured.

As will be evident to those skilled in the art, my invention permits various modifications without departing from the spirit thereof or the scope of the appended claim.

What we claim is:

In a machine for use in the manufacture of peanut butter of the class described having a fixed grinding member and a cooperating rotary grinding member, said grinding members having cooperating grinding surfaces of annular form, the inner peripheral portions of said grinding surfaces being provided with outwardly extending grooves having their outer portions merging with said grinding surfaces, means for feeding peanuts toward the inner peripheries of the grinding surfaces whereby the peanuts are permitted to enter said grooves and after being broken into lumps therein to work through the grooves to the grinding surfaces so as to be ground into peanut butter, and the butter discharged from between the outer peripheries of the grinding members, and a nozzle for receiving the peanut butter and discharging it from the machine, the improvement which consists in said grinding surfaces having additional grooves extending completely therethrough whereby some of the peanuts are permitted to enter these grooves and after being broken into lumps therein to work through these grooves and to mix with the peanut butter as the latter leaves the grinding members.

ROYAL H. DAVIS.
THOMAS F. PURNER.